(12) United States Patent
Merry et al.

(10) Patent No.: US 11,486,269 B2
(45) Date of Patent: Nov. 1, 2022

(54) GAS TURBINE ENGINE SHAFT BEARING CONFIGURATION

(71) Applicant: United Technologies Corporation, Farmington, CT (US)

(72) Inventors: Brian D. Merry, Andover, CT (US); Gabriel L. Suciu, Glastonbury, CT (US); Todd A. Davis, Tolland, CT (US); Gregory E. Reinhardt, South Glastonbury, CT (US); Enzo DiBenedetto, Kensington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 911 days.

(21) Appl. No.: 16/286,970

(22) Filed: Feb. 27, 2019

(65) Prior Publication Data
US 2020/0025030 A1    Jan. 23, 2020

Related U.S. Application Data

(60) Division of application No. 14/012,576, filed on Aug. 28, 2013, now Pat. No. 10,400,629, and a
(Continued)

(51) Int. Cl.
*F01D 25/16* (2006.01)
*F02C 7/36* (2006.01)
(Continued)

(52) U.S. Cl.
CPC .......... *F01D 25/162* (2013.01); *F01D 5/026* (2013.01); *F01D 15/12* (2013.01); *F01D 25/16* (2013.01);
(Continued)

(58) Field of Classification Search
None
See application file for complete search history.

(56) References Cited

U.S. PATENT DOCUMENTS 2,258,792 A    4/1941  New
2,672,726 A    3/1954  Wolf et al.
(Continued)

FOREIGN PATENT DOCUMENTS

EP    0203881    12/1986
EP    0791383    8/1997
(Continued)

OTHER PUBLICATIONS

Johnston, R.P., Hirschkron, R Koch, C.C., Neitzel, R.E., and Vinson, P.W. (1978). Energy efficient engine: Preliminary design and integration study—final report. NASA CR-135444. Sep. 1978. pp. 1-401.
(Continued)

*Primary Examiner* — Igor Kershteyn
*Assistant Examiner* — John S Hunter, Jr.
(74) *Attorney, Agent, or Firm* — Carlson, Gaskey & Olds, P.C.

(57) ABSTRACT

A gas turbine engine includes a core housing that includes an inlet case and an intermediate case that respectively provide an inlet case flow path and an intermediate case flow path. A first shaft supports a low pressure compressor section that is arranged axially between the inlet case flow path and the intermediate case flow path. A first bearing supports the first shaft relative to the inlet case. A second bearing supports a second shaft relative to the intermediate case. A low pressure compressor hub is mounted to the first shaft. The low pressure compressor hub extends to the low pressure compressor section between the first bearing and the second bearing.

19 Claims, 7 Drawing Sheets

Related U.S. Application Data continuation-in-part of application No. 13/904,416, filed on May 29, 2013, which is a continuation of application No. 13/762,970, filed on Feb. 8, 2013, now Pat. No. 8,511,061, which is a continuation of application No. 13/362,170, filed on Jan. 31, 2012, now Pat. No. 8,402,741.

(60) Provisional application No. 61/860,329, filed on Jul. 31, 2013.

(51) Int. Cl.
    *F02K 3/04*     (2006.01)
    *F02C 7/06*     (2006.01)
    *F01D 15/12*    (2006.01)
    *F01D 5/02*     (2006.01)

(52) U.S. Cl.
    CPC ............... *F02C 7/06* (2013.01); *F02C 7/36* (2013.01); *F02K 3/04* (2013.01); *Y02T 50/60* (2013.01)

(56) References Cited

U.S. PATENT DOCUMENTS

| | | | |
|---|---|---|---|
| 2,798,360 | A | 7/1957 | Hazen et al. |
| 2,850,337 | A | 9/1958 | McCallum |
| 2,936,655 | A | 5/1960 | Peterson et al. |
| 3,021,731 | A | 2/1962 | Stoeckicht |
| 3,194,487 | A | 7/1965 | Tyler et al. |
| 3,287,906 | A | 11/1966 | McCormick |
| 3,352,178 | A | 11/1967 | Lindgren et al. |
| 3,412,560 | A | 11/1968 | Gaubatz |
| 3,434,288 | A * | 3/1969 | Petrie ................ F02C 7/06 60/230 |
| 3,549,272 | A | 12/1970 | Bouiller et al. |
| 3,638,428 | A | 2/1972 | Shipley et al. |
| 3,664,612 | A | 5/1972 | Skidmore et al. |
| 3,673,802 | A | 7/1972 | Krebs et al. |
| 3,680,309 | A | 8/1972 | Wallace, Jr. |
| 3,727,998 | A | 4/1973 | Haworth et al. |
| 3,729,957 | A | 5/1973 | Petrie et al. |
| 3,737,109 | A | 6/1973 | Johansson |
| 3,738,719 | A | 6/1973 | Langner |
| 3,747,343 | A | 7/1973 | Rosen |
| 3,754,484 | A | 8/1973 | Roberts |
| 3,761,042 | A | 9/1973 | Denning |
| 3,765,623 | A | 10/1973 | Donelson et al. |
| 3,792,586 | A | 2/1974 | Kasmarik et al. |
| 3,820,719 | A | 6/1974 | Clark |
| 3,843,277 | A | 10/1974 | Ehrich |
| 3,892,358 | A | 7/1975 | Gisslen |
| 3,896,615 | A | 7/1975 | Slatkin et al. |
| 3,925,979 | A | 12/1975 | Ziegler |
| 3,932,058 | A | 1/1976 | Harner et al. |
| 3,935,558 | A | 1/1976 | Miller et al. |
| 3,971,208 | A | 7/1976 | Schwent |
| 3,988,889 | A | 11/1976 | Chamay et al. |
| 4,003,199 | A | 1/1977 | Bell et al. |
| 4,050,527 | A | 9/1977 | Lebelle |
| 4,055,946 | A | 11/1977 | Sens |
| 4,084,861 | A | 4/1978 | Greenberg et al. |
| 4,130,872 | A | 12/1978 | Harloff |
| 4,220,171 | A | 9/1980 | Ruehr et al. |
| 4,240,250 | A | 12/1980 | Harris |
| 4,251,987 | A | 2/1981 | Adamson |
| 4,284,174 | A | 8/1981 | Salvana et al. |
| 4,289,360 | A | 9/1981 | Zirin |
| 4,452,037 | A | 6/1984 | Waddington et al. |
| 4,478,551 | A | 10/1984 | Honeycutt, Jr. et al. |
| 4,500,143 | A | 2/1985 | Kervistin et al. |
| 4,523,864 | A | 6/1985 | Walter et al. |
| 4,649,114 | A | 3/1987 | Miltenburger et al. |
| 4,687,346 | A | 8/1987 | Suciu |
| 4,696,156 | A | 9/1987 | Burr et al. |
| 4,704,862 | A * | 11/1987 | Dennison ............ F01D 25/16 416/162 |
| 4,722,357 | A | 2/1988 | Wynosky |
| 4,727,762 | A | 3/1988 | Hayashi |
| 4,782,658 | A | 11/1988 | Perry |
| 4,827,712 | A | 5/1989 | Coplin |
| 4,867,655 | A | 9/1989 | Barbie et al. |
| 4,911,610 | A | 3/1990 | Olschewski et al. |
| 4,916,894 | A * | 4/1990 | Adamson ............ F02C 3/107 416/171 |
| 4,951,461 | A | 8/1990 | Butler |
| 4,952,076 | A | 8/1990 | Wiley, III et al. |
| 4,979,362 | A | 12/1990 | Vershure, Jr. |
| 4,981,415 | A | 1/1991 | Marmol et al. |
| 5,051,005 | A | 9/1991 | Duncan |
| 5,058,617 | A | 10/1991 | Stockman et al. |
| 5,102,379 | A | 4/1992 | Pagluica et al. |
| 5,127,794 | A | 7/1992 | Burge et al. |
| 5,141,400 | A | 8/1992 | Murphy et al. |
| 5,155,993 | A | 10/1992 | Baughman et al. |
| 5,174,525 | A | 12/1992 | Schilling |
| 5,317,877 | A | 6/1994 | Stuart |
| 5,343,696 | A | 9/1994 | Rohra et al. |
| 5,361,580 | A | 11/1994 | Ciokajlo et al. |
| 5,380,155 | A | 1/1995 | Varsik et al. |
| 5,410,870 | A | 5/1995 | Brauit et al. |
| 5,433,674 | A | 7/1995 | Sheridan et al. |
| 5,447,411 | A | 9/1995 | Curley et al. |
| 5,466,198 | A | 11/1995 | McKibbin et al. |
| 5,524,847 | A | 6/1996 | Brodell et al. |
| 5,553,449 | A | 9/1996 | Rodgers et al. |
| 5,622,438 | A | 4/1997 | Walsh et al. |
| 5,634,767 | A | 6/1997 | Dawson |
| 5,677,060 | A | 10/1997 | Terentieva et al. |
| 5,687,561 | A | 11/1997 | Newton |
| 5,778,659 | A | 7/1998 | Duesler et al. |
| 5,791,789 | A | 8/1998 | Van Duyn et al. |
| 5,806,303 | A | 9/1998 | Johnson |
| 5,809,772 | A | 9/1998 | Giffin, III et al. |
| 5,857,836 | A | 1/1999 | Stickler et al. |
| 5,860,275 | A | 1/1999 | Newton et al. |
| 5,867,980 | A | 2/1999 | Bartos |
| 5,915,917 | A | 6/1999 | Eveker et al. |
| 5,975,841 | A | 11/1999 | Lindemuth et al. |
| 5,985,470 | A | 11/1999 | Spitsberg et al. |
| 6,082,959 | A | 7/2000 | Van Duyn |
| 6,148,518 | A | 11/2000 | Weiner et al. |
| 6,158,210 | A * | 12/2000 | Orlando ............ F02C 3/067 415/173.7 |
| 6,203,273 | B1 | 3/2001 | Weiner et al. |
| 6,223,616 | B1 | 5/2001 | Sheridan |
| 6,315,815 | B1 | 11/2001 | Spadaccini et al. |
| 6,318,070 | B1 | 11/2001 | Rey et al. |
| 6,338,609 | B1 | 1/2002 | Decker et al. |
| 6,387,456 | B1 | 5/2002 | Eaton, Jr. et al. |
| 6,439,772 | B1 | 8/2002 | Ommundson et al. |
| 6,464,401 | B1 | 10/2002 | Allard |
| 6,517,341 | B1 | 2/2003 | Brun et al. |
| 6,607,165 | B1 | 8/2003 | Manteiga et al. |
| 6,619,030 | B1 | 9/2003 | Seda et al. |
| 6,623,166 | B2 | 9/2003 | Andren et al. |
| 6,709,492 | B1 | 3/2004 | Spadaccini et al. |
| 6,732,502 | B2 | 5/2004 | Seda et al. |
| 6,814,541 | B2 | 11/2004 | Evans et al. |
| 6,883,303 | B1 | 4/2005 | Seda |
| 6,942,451 | B1 | 9/2005 | Alexander et al. |
| 7,004,722 | B2 | 2/2006 | Teramura et al. |
| 7,021,042 | B2 | 4/2006 | Law |
| 7,219,490 | B2 | 1/2007 | Dev |
| 7,328,580 | B2 | 2/2008 | Lee et al. |
| 7,374,403 | B2 | 5/2008 | Decker et al. |
| 7,412,819 | B2 | 8/2008 | Bart et al. |
| 7,487,630 | B2 | 2/2009 | Weiler |
| 7,490,460 | B2 | 2/2009 | Moniz et al. |
| 7,493,753 | B2 | 2/2009 | Moniz et al. |
| 7,500,365 | B2 | 3/2009 | Suciu et al. |
| 7,591,594 | B2 | 9/2009 | Charier et al. |
| 7,591,754 | B2 | 9/2009 | Duong et al. |

(56) References Cited

U.S. PATENT DOCUMENTS

| | | |
|---|---|---|
| 7,632,064 B2 | 12/2009 | Somanath |
| 7,634,916 B2 | 12/2009 | Mace et al. |
| 7,662,059 B2 | 2/2010 | McCune |
| 7,694,505 B2 | 4/2010 | Schilling |
| 7,704,178 B2 | 4/2010 | Sheridan et al. |
| 7,721,549 B2 | 5/2010 | Baran |
| 7,730,715 B2 | 6/2010 | Grudnoski et al. |
| 7,806,651 B2 | 10/2010 | Kennepohl et al. |
| 7,824,305 B2 | 11/2010 | Duong et al. |
| 7,828,682 B2 | 11/2010 | Smook |
| 7,832,193 B2 | 11/2010 | Orlando et al. |
| 7,882,693 B2 | 2/2011 | Schilling |
| 7,883,315 B2 | 2/2011 | Suciu et al. |
| 7,905,083 B2 | 3/2011 | Orlando et al. |
| 7,926,260 B2 | 4/2011 | Sheridan et al. |
| 7,997,868 B1 | 8/2011 | Liang et al. |
| 8,075,261 B2 | 12/2011 | Merry et al. |
| 8,104,262 B2 | 1/2012 | Marshall |
| 8,205,432 B2 | 6/2012 | Sheridan |
| 8,225,593 B2 | 7/2012 | Le Hong et al. |
| 8,337,149 B1 | 12/2012 | Hasel et al. |
| 8,402,741 B1 | 3/2013 | Merry et al. |
| 8,511,061 B1 | 8/2013 | Merry et al. |
| 8,672,801 B2 | 3/2014 | McCune et al. |
| 9,194,329 B2 | 11/2015 | Merry et al. |
| 9,957,918 B2 | 5/2018 | Suciu et al. |
| 10,215,094 B2 | 2/2019 | Merry et al. |
| 11,149,689 B2 | 10/2021 | Merry et al. |
| 2001/0047651 A1 | 12/2001 | Fukutani |
| 2005/0026745 A1 | 2/2005 | Mitrovic |
| 2005/0150204 A1 | 7/2005 | Stretton et al. |
| 2005/0265825 A1 | 12/2005 | Lewis |
| 2006/0090451 A1 | 5/2006 | Moniz et al. |
| 2006/0130456 A1 | 6/2006 | Suciu et al. |
| 2006/0196164 A1 | 9/2006 | Donohue |
| 2006/0228206 A1 | 10/2006 | Decker et al. |
| 2006/0239845 A1 | 10/2006 | Yamamoto et al. |
| 2007/0084183 A1 | 4/2007 | Moniz et al. |
| 2007/0084190 A1 | 4/2007 | Moniz et al. |
| 2007/0087892 A1 | 4/2007 | Orlando et al. |
| 2007/0251210 A1 | 11/2007 | Ceric et al. |
| 2008/0003096 A1 | 1/2008 | Kohli et al. |
| 2008/0022653 A1 | 1/2008 | Schilling |
| 2008/0053062 A1 | 3/2008 | Tuttle |
| 2008/0098715 A1 | 5/2008 | Orlando et al. |
| 2008/0098717 A1 | 5/2008 | Orlando et al. |
| 2008/0116009 A1 | 5/2008 | Sheridan et al. |
| 2008/0148707 A1 | 6/2008 | Schilling |
| 2008/0152477 A1 | 6/2008 | Moniz et al. |
| 2008/0155961 A1 | 7/2008 | Johnson |
| 2008/0317588 A1 | 12/2008 | Grabowski et al. |
| 2009/0056306 A1 | 3/2009 | Suciu et al. |
| 2009/0056343 A1 | 3/2009 | Suciu et al. |
| 2009/0074565 A1 | 3/2009 | Suciu et al. |
| 2009/0081035 A1 | 3/2009 | Merry et al. |
| 2009/0081039 A1 | 3/2009 | McCune et al. |
| 2009/0090096 A1 | 4/2009 | Sheridan |
| 2009/0092487 A1* | 4/2009 | McCune ............ F01D 25/16 415/209.2 |
| 2009/0123271 A1 | 5/2009 | Coffin et al. |
| 2009/0180864 A1 | 7/2009 | Alvanos et al. |
| 2009/0304518 A1 | 12/2009 | Kodama et al. |
| 2009/0314881 A1 | 12/2009 | Suciu et al. |
| 2010/0058735 A1 | 3/2010 | Hurwitz et al. |
| 2010/0105516 A1 | 4/2010 | Sheridan et al. |
| 2010/0148396 A1 | 6/2010 | Xie et al. |
| 2010/0150702 A1 | 6/2010 | Sheridan et al. |
| 2010/0170224 A1 | 7/2010 | Clark et al. |
| 2010/0212281 A1 | 8/2010 | Sheridan |
| 2010/0218478 A1* | 9/2010 | Merry ................ F02C 3/107 60/205 |
| 2010/0218483 A1 | 9/2010 | Smith |
| 2010/0223903 A1 | 9/2010 | Starr |
| 2010/0294371 A1* | 11/2010 | Parnin ............... F16K 17/36 137/1 |
| 2010/0296947 A1* | 11/2010 | DiBenedetto ........ F01D 25/20 417/381 |
| 2010/0331139 A1 | 12/2010 | McCune |
| 2011/0047959 A1 | 3/2011 | DiBenedetto |
| 2011/0123326 A1 | 5/2011 | DiBenedetto et al. |
| 2011/0130246 A1 | 6/2011 | McCune et al. |
| 2011/0159797 A1 | 6/2011 | Beltman et al. |
| 2011/0219781 A1 | 9/2011 | Benjamin et al. |
| 2011/0289900 A1 | 12/2011 | Stern |
| 2011/0293423 A1 | 12/2011 | Bunker et al. |
| 2012/0124964 A1 | 5/2012 | Hasel et al. |
| 2012/0192570 A1 | 8/2012 | McCune et al. |
| 2012/0195753 A1 | 8/2012 | Davis et al. |
| 2012/0243971 A1 | 9/2012 | McCune et al. |
| 2012/0257960 A1 | 10/2012 | Reinhardt et al. |
| 2013/0023378 A1 | 1/2013 | McCune et al. |
| 2013/0192198 A1 | 8/2013 | Brilliant et al. |
| 2013/0319006 A1 | 12/2013 | Parnin et al. |

FOREIGN PATENT DOCUMENTS

| | | | |
|---|---|---|---|
| EP | 1142850 | | 10/2001 |
| EP | 1013889 | | 8/2005 |
| EP | 1939430 | A2 | 7/2008 |
| EP | 2060809 | | 2/2011 |
| EP | 2559913 | | 2/2013 |
| EP | 2584153 | | 4/2013 |
| EP | 2597292 | | 5/2013 |
| GB | 1516041 | | 6/1978 |
| GB | 2041090 | | 9/1980 |
| GB | 2426792 | | 12/2006 |
| WO | 2007038674 | | 4/2007 |
| WO | WO-2015047489 A1 * | | 4/2015 ........... F01D 25/162 |

OTHER PUBLICATIONS

Johnston, R.P. and Hemsworth, M.C. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp 1-187.

Anderson, R.D. (1985). Advanced Propfan Engine Technology (APET) definition study, single and counter-rotation gearbox/pitch change mechanism design. NASA CR-168115. Jul. 1, 1985. pp 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.

Gray, D.E. (1978). Energy efficient engine preliminary design and integration studies. NASA-CP-2036-PT-1. Nov. 1978. pp. 89-110.

(56) References Cited

OTHER PUBLICATIONS

Kandebo, S.W. (1998). Pratt & Whitney launches geared turbofan engine. Aviation Week & Space Technology, 148 (8). p. 32-34.
Kandebo, S.W. (1998). Geared-Turbofan engine design targets cost, complexity. Aviation Week & Space Technology, 148(8). p. 34-35.
Davis, D.G.M. (1973). Variable-pitch fans: Progress in Britain. Flight International. Apr. 19, 1973. pp. 615-617.
Levintan, R.M. (1975). Q-Fan demonstrator engine. Journal of Aircraft. vol. 12( 8). Aug. 1975. pp. 658-663.
Aerospace Information Report. (2008). Advanced ducted propulsor in-flight thrust determination. SAE International AIR5450. Aug. 2008. p. 1-392.
Technical Report. (1975). Quiet Clean Short-haul Experimental Engine (QCSEE) UTW fan preliminary design. NASA-CR-134842. Feb. 1, 1975. pp. 1-98.
Daggett, D.L., Brown, S.T., and Kawai, R.T. (2003). Ultra-efficient engine diameter study. NASA/CR-2003-212309. May 2003. pp. 1-52.
Technical Report. (1977). Quiet Clean Short-haul Experimental Engine (QCSEE) Under-the-Wing (UTW) final design report. NASA-CR-134847. Jun. 1, 1977. pp. 1-697.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Lord, W.K., MacMartin, D.G., and Tillman, T.G. (2000). Flow control opportunities in gas turbine engines. American Institute of Aeronautics and Astronautics, pp. 1-15.
Daly, M. Ed. (2010). Jane's Aero-Engine. Issue Twenty-seven. Mar. 2010. p. 633-636.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.

Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76 (1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
2003 NASA seal/secondary air system workshop. (2003). NASA/CP-2004-212963/vol. 1. Sep. 1, 2004. pp. 1-408.
Berton, J.J. and Guynn, M.D. (2012). Multi-objective optimization of a turbofan for an advanced, single-aisle transport. NASA/TM-2012-217428. pp. 1-26.
Bloomer, H.E. and Samanich, N.E. (1982). QCSEE under-the-wing engine acoustic data. NASA-TM-82691. May 1, 1982. pp. 1-28.

(56) References Cited

OTHER PUBLICATIONS

Bloomer, H.E. and Samanich, N.E. (1982). QCSEE under-the-wing enging-wing-flap aerodynamic profile characteristics. NASA-TM-82890. Sep. 1, 1982. pp. 1-48.

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.

Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.

Guynn, M.D., et al., "Analysis of turbofan design options for an advanced single-aisle transport aircraft", American Institute of Aeronautics and Astronautics, 2009, pp. 1-13.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Toward, D.F. (1976). QCSEE preliminary under the wing flight propulsion system analysis report. NASA CR-134868. Feb. 1, 1976. pp. 1-260.

Kandebo, S.W. (1998). Pratt & Whitney launches geared turbofan engine. Aviation Week & Space Technology, 148 (8). p. 32-4.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

McCracken, R.C. (1979). Quiet short-haul research aircraft familiarization document. NASA-TM-81149. Nov. 1, 1979. pp. 1-76.

Neitzel, R., Lee, R., and Chamay, A.J. (1973). Engine and installation preliminary design. Jun. 1, 1973. pp. 1-333.

QCSEE ball spline pitch-change mechanism whirligig test report. (1978). NASA-CR-135354. Sep. 1, 1978. pp. 1-57.

QCSEE over-the-wing propulsion system test report vol. III—mechanical performance. (1978). NASA-CR-135325. Feb. 1, 1978. pp. 1-112.

QCSEE Preliminary analyses and design report. vol. 1. (1974). NASA-CR-134838. Oct. 1, 1974. pp. 1-337.

QCSEE the aerodynamic and mechanical design of the QCSEE under-the-wing fan. (1977). NASA-CR-135009. Mar. 1, 1977. pp. 1-137.

QCSEE the aerodynamic and preliminary mechanical design of the QCSEE OTW fan. (1975). NASA-CR-134841. Feb. 1, 1975. pp. 1-74.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

Rotordynamic instability problems in high-performance turbomachinery. (1986). NASA conference publication 2443. Jun. 2-4, 1986.

Smith, C.E., Hirschkron, R., and Warren, R.E. (1981). Propulsion system study for small transport aircraft technology (STAT). Final report. NASA-CR-165330. May 1, 1981. pp. 1-216.

Sowers, H.D. and Coward, W.E. (1978). QCSEE over-the-wing (OTW) engine acuostic design. NASA-CR-135268. Jun. 1, 1978. pp. 1-52.

Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

(56) References Cited

OTHER PUBLICATIONS

Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p 1-.
Kurzke, J. (2012). GasTurb 12: Design and off-design performance of gas turbines. Retrieved from: https://www.scribd.com/document/153900429/GasTurb-12.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A porgram to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
MacIsaac, B. and Langston, R. (2011). Gas turbine propulsion systems. Chichester, West Sussex: John Wiley & Sons, Ltd. pp. 260-265.
Datasheet. CFM56-5B For the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 707-712.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Avco Lycoming Divison. ALF 502L Maintenance Manual. Apr. 1981. pp. 1-118.
Dassault Falcon 900EX Easy Systems Summary. Retrieved from: http://www.smartcockpit.com/docs/F900EX-Engines.pdf pp. 1-31.
Garret TFE731 Turbofan Engine (CAT C). Chapter 79: Lubrciation System. TTFE731 Issue 2. 2010. pp. 1-24.

(56) References Cited

OTHER PUBLICATIONS

Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Haldenbrand, R. and Norgren, W.M. (1979). Airesearch QCGAT program [quiet clean general aviation turbofan engines]. NASA-CR-159758. pp. 1-199.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Honeywell LF502. Jane's Aero-engines, Aero-engines—Turbofan. Aug. 17, 2016.
Honeywell TFE731-5AR to -5BR Engine Conversion Program. Sep. 2005. pp. 1-4.
Howe, D.C., and Wynosky, T.A. (1985). Energy efficient engine program advanced turbofan nacelle definition study. NASA-CR-174942. May 1985. pp. 1-60.
Leckie, F.A. and Dal Bello, D.J. (2009). Strength and stiffness of engineering systems. Mechanical Engineering Series. Springer. pp. 1-10, 48-51.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Munt, R. (1981). Aircraft technology assessment: Progress in low emissions engine. Technical Report. May 1981. pp. 1-171.
Rauch, D. (1972). Design study of an air pump and integral lift engine ALF-504 using the Lycoming 502 core. Prepare for NASA. Jul. 1972. pp. 1-182.
Type Certificate Data Sheet No. E6NE. Department of Transportation Federal Aviation Administration. Jun. 7, 2002. pp. 1-10.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
European Search Report for European Application No. 18208937.5 dated Mar. 8, 2019.
Gunston, Bill, "Jane's Aero-Engines," Issue Seven, 2000, pp. 510-512.
Fledderjohn, "The TFE731-5: Evolution of a Decade of Business Jet Service," SAE Technical Paper, Business Aircraft Meeting & Exposition, Apr. 12-15, 1983.
Walsh et al., "Gas Turbine Performance," 1998, 2004, Blackwell Science Ltd., Chapter 5, pp. 159-177.
International Search Report for PCT Application No. PCT/US2013/020462, dated Jul. 30, 2013.
International Search Report and Written Opinion for PCT Application No. PCT/US2014/043195 dated Feb. 18, 2015.
International Search Report and Written Opinion for PCT/US14/43175 completed on Dec. 17, 2014.
International Search Report and Written Opinion for PCT/US14/43184 completed on Dec. 1, 2014.
Extended European Search Report for European Application No. 14831206.9 dated Mar. 2, 2017.
Amato et al, "Planetary Gears" poster, http://www.roymech.co.uk/Useful_Tables/drive/Epi_cyclic-gears.html, downloaded Aug. 6, 2015 1 page.
"Epicylic Gears", http://www.webpages.uidaho.edu/mindworks/Machine_Design/Posters/PDF/Planetary%20Gears%20Poster.pdf, downloaded Aug. 6, 2015, pp. 1-12.
European Search Report for European Patent Application No. 14849357.0 dated Feb. 22, 2017.
European Search Report for European Patent Application No. 14831790.2 dated Mar. 29, 2017.
International Preliminary Report on Patentability for PCT Application No. PCT/US2014/043195, dated Feb. 11, 2016.
International Preliminary Report on Patentability for PCT Application No. PCT/US2014/043184, dated Feb. 11, 2016.
International Preliminary Report on Patentability for PCT Application No. PCT/US2014/043175, dated Feb. 11, 2016.
Extended European Search Report for European Application No. 15199861.4 dated Sep. 16, 2016.
"Fan engineering, Information and recommendations for the engineer," Twin City Fan Companies, LTD, 2000.
Supplementary European Search Report for European Patent Application No. 13770230.4, dated Aug. 6, 2015.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen

(56) References Cited

OTHER PUBLICATIONS permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_ptfe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.H. and Schairer, E.T. (1977). Analysis of turbofan propulsion system weight and dimensions. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

Datasheet. CF6-80C2 high-bypass turbofan engines. Retreived from https://geaviation.com/sites/default/files/datasheet-CF6-80C2.pdf.

"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".

Datasheet. Genx™ high bypass turbofan engines. Retreived from: https://www.geaviation.com/sites/default/files/datasheet-genx.pdf.

International Preliminary Report on Patentability for PCT Application No. PCT/US2013/020462, dated Aug. 5, 2014. dated Aug. 14, 2014.

Extended European Search Report for European Application No. 14849357.0 dated Feb. 22, 2017.

Agarwal, B.D and Broutman, L.J. (1990). Analysis and performance of fiber composites, 2nd Edition. John Wiley & Sons, Inc. New York: New York. pp. 1-11, 13-23, 26-33, 50-51, 56-58, 60-61, 64-71, 87-89, 324-329, 436-437 (leading No. "3" in the title).

Willis, W.S. (1979). Quiet clean short-haul experimental engine (QCSEE) final report. NASA/CR-159473 pp. 1-289 if including related reports & distribution list pp. 1-293. Report broken down into 4 parts (17a, 17b, 17c and 17d) with total amount of pages submitted equaling 311 pages.

Lynwander, P. (1983). Gear drive systems: Design and application. New York, New York: Marcel Dekker, Inc. pp. 1-19, 145,293-323, 355, 357-358. Report broken down into 3 parts (25a, 25b and 25c) with total amount of pages submitted equaling 71 pages.

NASA Conference Publication. Quiet, powered-lift propulsion. Cleveland, Ohio. Nov. 14-15, 1978. pp. 1-420 including Biography. Report broken down into 10 parts (53a, 53b, 53c, 53d, 53e, 53f, 53g, 53h, 53i, 53j) with total amount of pages submitted equaling 429 pages.

Kurzke, J. (2008). Preliminary Design, Aero-engine design: From state of the art turbofans towards innovative architectures. pp. 1-76. Report broken down into 2 parts (59a and 59b) with total amount of pages submitted equaling 83 pages.

Han, J., Dutta, S., and Ekkad, S.V. (2000). Gas turbine heat transfer and cooling technology. New York, NY: Taylor & Francis. pp. 1-25, 129-157, and 160-249. Report broken down into 3 parts (61a, 61b and 61c) with total amount of pages submitted equaling 159 pages (leading No. "61" in the title).

Declaration of Reza Abhari. In re U.S. Pat. No. 8,695,920. Executed Nov. 30. pp. 1-67. Report broken down into 3 parts (65a, 65b and 65c) with total amount of pages submitted equaling 67 pages.

Declaration of Reza Abhari. In re U.S. Pat. No. 8,448,895. Executed Nov. 28. pp. 1-81. Report broken down into 3 parts (66a, 66b and 66c) with total amount of pages submitted equaling 81 pages.

Declaration of Reza Abhari. In re U.S. Pat. No. 8,695,920, challenged claims 1-4, 7-14, 17 and 19. Executed Nov. 29. pp. 1-102. Report broken down into 4 parts (67a, 67b, 67c and 67d) with total amount of pages submitted equaling 102 pages.

Declaration of Dr. Magdy Attia. In re U.S. Pat. No. 8,313,280. Executed Oct. 21, 2016. pp. 1-88.Report broken down into 3 parts (68a, 68b, and 68c) with total amount of pages submitted equaling 88 pages.

Roux, E. (2007). Turbofan and turbojet engines database handbook. Editions Elodie Roux. Blagnac: France. pp. 1-595. Report broken down into 12 parts (71a, 71b, 71c, 71d, 71e, 71f, 71g, 71h, 71i, 71j, 71k, 71l) with total amount of pages submitted equaling 598 pages.

(56) References Cited

OTHER PUBLICATIONS

Declaration of Dr. Magdy Attia. In re U.S. Pat. No. 8,517,668. Executed Dec. 8, 2016. pp. 1-81 (including Exhibit A which is 11 pages). Report broken down into 3 parts (73a, 73b, and 73c) with total amount of pages submitted equaling 81 pages.
Lee, K.N. (2000). Current status of environmental barrier coatings for Si-Based ceramics. Surface and Coatings Technology 133-134, 2000. pp. 1-7. Total of 7 pages submitted—(leading No. "80" in the title).
Bucknell, R.L. (1973). Influence of fuels and lubricants on turbine engine design and performance, fuel and lubricant analyses. Final Technical Report, Mar. 1971-Mar. 1973. pp. 1-252. Report broken down into 2 parts (111a and 111b) with total amount of pages submitted equaling 273 pages.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256. No running page numbers. Report broken down into 2 parts (133a and 133b) with total amount of pages submitted equaling 256 pages.
Salemme, C.T. and Murphy, G.C. (1979). Metal spar/superhybrid shell composite fan blades. Prepared for NASA. NASA-CR-159594. Aug. 1979. pp. 1-130 including distribution list. Report broken down into 2 parts (148a and 148b) with total amount of pages submitted equaling 142 pages.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157. Report broken down into 3 parts (171a, 171b and 171c) with total amount of pages submitted equaling 221 pages.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears. Original blurry copy of screenshot and clear recaptured text submitted (leading No. "181" in the title).
Bloomer, H.E. and Loeffler, I.J. (1982). QCSEE over-the-wing engine acoustic data. NASA-TM-82708. May 1, 1982. pp. 1-558. Report broken down into 12 parts with total amount of pages submitted equaling 558 pages.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.Report broken down into 2 parts (Part 1, Part2, ) with total amount of pages submitted equaling 187 pages.
Litt, J.S. (2018). Sixth NASA Glenn Research Center propulsion control and diagnostics (PCD) workshop. NASA/CP-2018-219891. Apr. 1, 2018. pp. 1-400.Report broken down into 5 parts (Part1, Part2, Part3, Part4 and Part5) with total amount of pages submitted equaling 400 pages.
Neitzel, R.E., Hirschkron, R. and Johnston, R.P. (1976). Study of unconventional aircraft engines designed for low energy consumption. NASA-CR-135136. Dec. 1, 1976. pp. 1-153. Report broken down into 2 parts (Part1 and Part2) with total amount of pages submitted equaling 165 pages.
Parametric study of STOL short-haul transport engine cycles and operational techniques to minimize community noise impact. NASA-CR-114759. Jun. 1, 1974. pp. 1-397. Report broken down into 5 parts (Part1 through Part5) with total amount of pages submitted equaling 368 pages.
QCSEE main reduction gears bearing development program final report. (1975). NASA-CR-134890. Dec. 1, 1975. pp. 1-41. Total pages submitted 41.
QCSEE over-the-wing final design report. (1977). NASA-CR-134848. Jun. 1, 1977. pp. 1-460. Report broken down into 4parts (Part1, Part2, Part3, Part4) with total amount of pages submitted equaling 490 pages.

QCSEE preliminary analyses and design report. vol. II. (1974). NASA-CR-134839. Oct. 1, 1974. pp. 339-630. Report broken down into 4parts (Part1, Part2, Part3, Part4) with total amount of pages submitted equaling 331 pages.
Singh, R. and Houser, D.R. (1990). Non-linear dynamic analysis of geared systems. NASA-CR-180495. Feb. 1, 1990. pp. 1-263. Report broken down into 2 parts (Part1 and Part2) with total amount of pages submitted equaling 263 pages.
U.S. Appl. No. 13/362,170, filed Jan. 31, 2012, Ted Kim.
U.S. Appl. No. 13/364,798, filed Feb. 2, 2012, Christopher M. Verdier, 19 pages.
U.S. Appl. No. 13/762,970, filed Feb. 8, 2013, Tae Jun Kim, 17 pages.
U.S. Appl. No. 13/904,416, filed May 29, 2013, 16 pages.
Honeywell TFE731 Pilot Tips. pp. 1-143. Total pages submitted is 77.
Howe, D.C., and Wynosky, T.A. (1985). Energy efficient engine program advanced turbofan nacelle definition study. NASA-CR-174942. May 1985.pp. 1-75 and 95-166. University of Washington dated Dec. 13, 1990. Report broken down into 2 parts (Part1 and Part2) with total amount of pages submitted equaling 174 pages.
"Civil Turbojet/Turbofan Specifications", Jet Engine Specification Database (Apr. 3, 2005). Total of 8 pages submitted. (Has "Number 1" On First Page).
Declaration of Reza Abhari, Ph.D. In re U.S. Pat. No. 8,844,265. Executed Jun. 28, 2016. pp. 1-91. Report broken down into 2 parts with total amount of pages submitted equaling 91 pages. *Has "Number 2-A" and "No. 2-B" On First Page of Each of the Two Parts Uploaded).
Declaration of John Eaton, Ph.D. In re U.S. Pat. No. 8,869,568. Executed Mar. 28, 2016. pp. 1-87. Report broken down into 2 parts with total amount of pages submitted equaling 87 pages. Has "No. 3-A" and "No. 3-B" On First Page of Each of the Two Parts Uploaded).
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26. Total of 31 pages submitted—(Has "Number 4" On First Page).
Hazlett, R.N. (1991). Thermal oxidation stability of aviation turbine fuels. Philadelphia, PA: ASTM. pp. 1-163. Report broken down into 3 parts with total amount of pages submitted equaling 175 pages. (Has "Number 5-A" and "Number 5-B" and "No. 5-C" On First Page of Each of the Three Parts Uploaded).
Dalton, III., W.N. (2003). Ultra high bypass ratio low noise engine study. NASA/CR-2003-212523. Nov. 2003. pp. 1-187. Report broken down into 3 parts (part1, part2, part3) with total amount of pages submitting equaling 187 sages. Has No. 6-A and "No. 6-B" and "No. 6-C" On First Page of Each of the Three Parts Uploaded).
Misel, O.W. (1977). QCSEE main reduction gears test program. NASA CR-134669. Mar. 1, 1977. pp. 1-222. Report broken down into 8 parts with total amount of pages submitted equaling 222 pages. (Has "No. 7-A", 7-B, 7-C, 7-D, 7-E, 7-F, 7-G, 7-H On First Page of Each of The 8 Parts Uploaded).
QCSEE hamilton standard cam/harmonic drive variable pitch fan actuation system derail design report. (1976). NASA-CR-134852. Mar. 1, 1976. pp. 1-172. Total pages submitted 160. (Has No. 8 On First Page).
QCSEE under-the-wing engine composite fan blade preliminary design test report. (1975). NASA-CR-134846. Sep. 1, 1975. pp. 1-51. Total pages submitted equaling 56. (Has No. 9 On First Page).
QCSEE under-the-wing engine digital control system design report. (1978). NASA-CR-134920. Jan. 1, 1978. pp. 1-309. Report broken down into 6 parts with total amount of pages submitted equaling 431 pages. (Has "No. 10-A", 10-B, 10-C, 10-D, 10-E, and 10-F On First Page of Each of The 6 Parts Uploaded).
Quiet clean general aviation turbofan (QCGAT) technology study final report vol. I. (1975). NASA-CR-164222. Dec. 1, 1975. pp. 1-186. Report broken down into 3 parts with total amount of pages submitted equaling 191 pages. (Has "No. 11-A", No. 11-B and "No. 11-C "On First Page of Each of The 3 Parts Uploaded).
Sargisson, D.F. (1985). Advanced propfan engine technology (APET) and single-rotation gearbox/pitch change mechanism. NASA Contractor Report-168113. R83AEB592. Jun. 1, 1985. pp. 1-508. Report

(56) References Cited

OTHER PUBLICATIONS broken down into 4 parts with total amount of pages submitted equaling 476 pages. (Has "No. 12-A", "No. 12-B, "No. 12-C and "No. 12-D" On First Page of Each of the Four Parts Uploaded).

\* cited by examiner

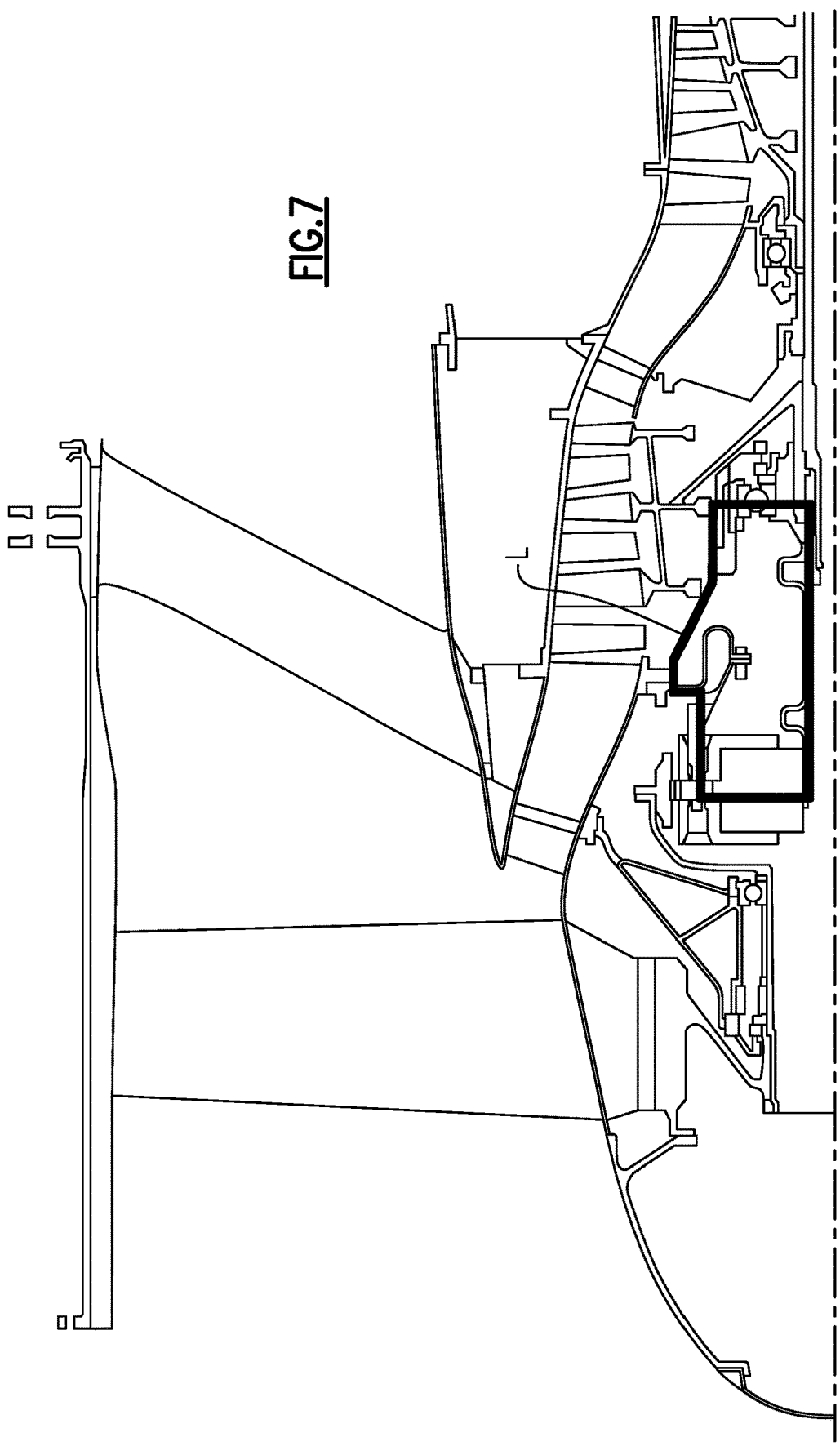

GAS TURBINE ENGINE SHAFT BEARING CONFIGURATION

CROSS REFERENCE TO RELATED APPLICATIONS

This application is a divisional of U.S. application Ser. No. 14/012,576 filed on Aug. 28, 2013, which claims priority to provisional application No. 61/860,329 filed on Jul. 31, 2013. U.S. application Ser. No. 14/012,576 is also a continuation-in-part of U.S. application Ser. No. 13/904,416 filed on May 29, 2013, which is a continuation of U.S. application Ser. No. 13/762,970 filed on Feb. 8, 2013, now U.S. Pat. No. 8,511,061 issued Aug. 20, 2013, which is a continuation of U.S. application Ser. No. 13/362,170 filed on Jan. 31, 2012, now U.S. Pat. No. 8,402,741 issued Mar. 26, 2013.

BACKGROUND

Turbomachines, such as gas turbine engines, typically include a fan section, a turbine section, a compressor section, and a combustor section. The fan section drives air along a core flow path into the compressor section. The compressed air is mixed with fuel and combusted in the combustor section. The products of combustion are expanded in the turbine section.

A typical jet engine has two or three spools, or shafts, that transmit torque between the turbine and compressor sections of the engine. Each of these spools is typically supported by two bearings. One bearing, for example, a ball bearing, is arranged at a forward end of the spool and is configured to react to both axial and radial loads. Another bearing, for example, a roller bearing is arranged at the aft end of the spool and is configured to react only to radial loads. This bearing arrangement fully constrains the shaft except for rotation, and axial movement of one free end is permitted to accommodate engine axial growth.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet or star gears supported by a carrier between and in meshed engagement with both the sun gear and the ring gear. The gear train elements share a common longitudinal central axis, about which at least two rotate.

During flight, light weight structural cases may deflect with aero and maneuver loads which may cause significant deflection commonly known as backbone bending of the engine. This deflection may result in some misalignment of the gear train elements which may lead to efficiency losses and potential reduced gear life.

SUMMARY

In one exemplary embodiment, a gas turbine engine includes a core housing that includes an inlet case and an intermediate case that respectively provide an inlet case flow path and an intermediate case flow path. A first shaft supports a low pressure compressor section that is arranged axially between the inlet case flow path and the intermediate case flow path. A first bearing supports the first shaft relative to the inlet case. A second bearing supports a second shaft relative to the intermediate case. A low pressure compressor hub is mounted to the first shaft. The low pressure compressor hub extends to the low pressure compressor section between the first bearing and the second bearing.

In a further embodiment of the above, the low pressure compressor hub includes a frustro-conical web which extends between the first bearing and the second bearing.

In a further embodiment of the above, the frustro-conical web extends at least partially around the first bearing.

In a further embodiment of the above, the low pressure compressor is radially outboard of the first bearing.

In a further embodiment of the above, the low pressure compressor hub is angled, relative to an engine axis, toward the low pressure compressor section.

In a further embodiment of the above, the low pressure compressor hub is mounted to a second stage disk of the low pressure compressor section.

In a further embodiment of the above, the low pressure compressor section includes three stages.

In a further embodiment of the above, the first shaft drives a fan through a geared architecture.

In a further embodiment of the above, the first bearing is mounted to a front center body case structure. The front center body case structure defines a core flow path for a core airflow.

In a further embodiment of the above, the inlet case includes a first inlet case portion defining the inlet case flow path. A bearing support portion is removably secured to the inlet case portion. The first bearing is mounted to the bearing support portion.

In a further embodiment of the above, the intermediate case includes an intermediate case portion that defines the intermediate case flow path. A bearing support portion is removably secured to the intermediate case portion. The second bearing is mounted to the bearing support portion.

In a further embodiment of the above, the first bearing is a ball bearing. The second bearing is a roller bearing.

In a further embodiment of the above, the first and second bearings are arranged in separate sealed lubrication compartments.

In a further embodiment of the above, a geared architecture is configured to be driven by the first shaft. A fan is coupled to and rotationally driven by the geared architecture.

In a further embodiment of the above, the first shaft includes a main shaft and a flex shaft. The flex shaft is secured to the main shaft at a first end and including a second end opposite the first end, wherein the geared architecture includes a sun gear supported on the second end.

In a further embodiment of the above, the low pressure compressor hub is secured to the main shaft. The low pressure compressor section includes a rotor mounted to the low pressure compressor hub. The pressure compressor hub supports the first bearing.

In a further embodiment of the above, the inlet case includes an inlet case portion that defines the inlet case flow path. A bearing support portion is removably secured to the inlet case portion. The first bearing is mounted to the bearing support portion.

In a further embodiment of the above, the geared architecture includes a torque frame that supports multiple circumferentially arranged star gears that intermesh with the sun gear. The torque frame is secured to the inlet case.

In a further embodiment of the above, the rotor supports multiple compressor stages. The first bearing is axially aligned with and radially inward of one of the compressor stages.

In another exemplary embodiment, a gas turbine engine includes a core housing that provides a core flow path. A shaft supports a compressor section arranged within the core flow path. First and second bearings support the shaft relative to the core housing and are arranged radially inward of and axially overlapping with the compressor section. A low pressure compressor hub is mounted to the shaft. The low pressure compressor hub extends to the low pressure compressor section between the first bearing and the second bearing.

In a further embodiment of the above, the gas turbine engine includes a fan. The compressor section is fluidly connected to the fan. The compressor section comprises of a high pressure compressor and a low pressure compressor. A combustor is fluidly connected to the compressor section. A turbine section is fluidly connected to the combustor.

In a further embodiment of the above, the gas turbine engine includes a front center body case structure. The first bearing is mounted to the front center body case structure to rotationally support the shaft. A geared architecture is at least partially supported by the front center body case structure. A coupling shaft is mounted to the shaft and the geared architecture. The coupling shaft is at least partially supported by the first bearing.

In a further embodiment of the above, the shaft drives the fan through the geared architecture.

In a further embodiment of the above, the shaft is an inner shaft and comprises an outer shaft which at least partially surrounds the inner shaft. The outer shaft drives the high pressure compressor.

In a further embodiment of the above, the core housing includes a first inlet case portion that defines an inlet case flow path. A bearing support portion is removably secured to the inlet case portion. The second bearing is mounted to the bearing support portion.

In a further embodiment of the above, the core housing includes an intermediate case portion that defines an intermediate case flow path. A bearing support portion is removably secured to the intermediate case portion. The first bearing is mounted to the bearing support portion.

BRIEF DESCRIPTION OF THE DRAWINGS

The disclosure can be further understood by reference to the following detailed description when considered in connection with the accompanying drawings wherein:

FIG. 7 is an enlarged schematic cross-section of the FIG. 5 sectional of the gas turbine engine embodiment which illustrates a load path within the front center body case structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
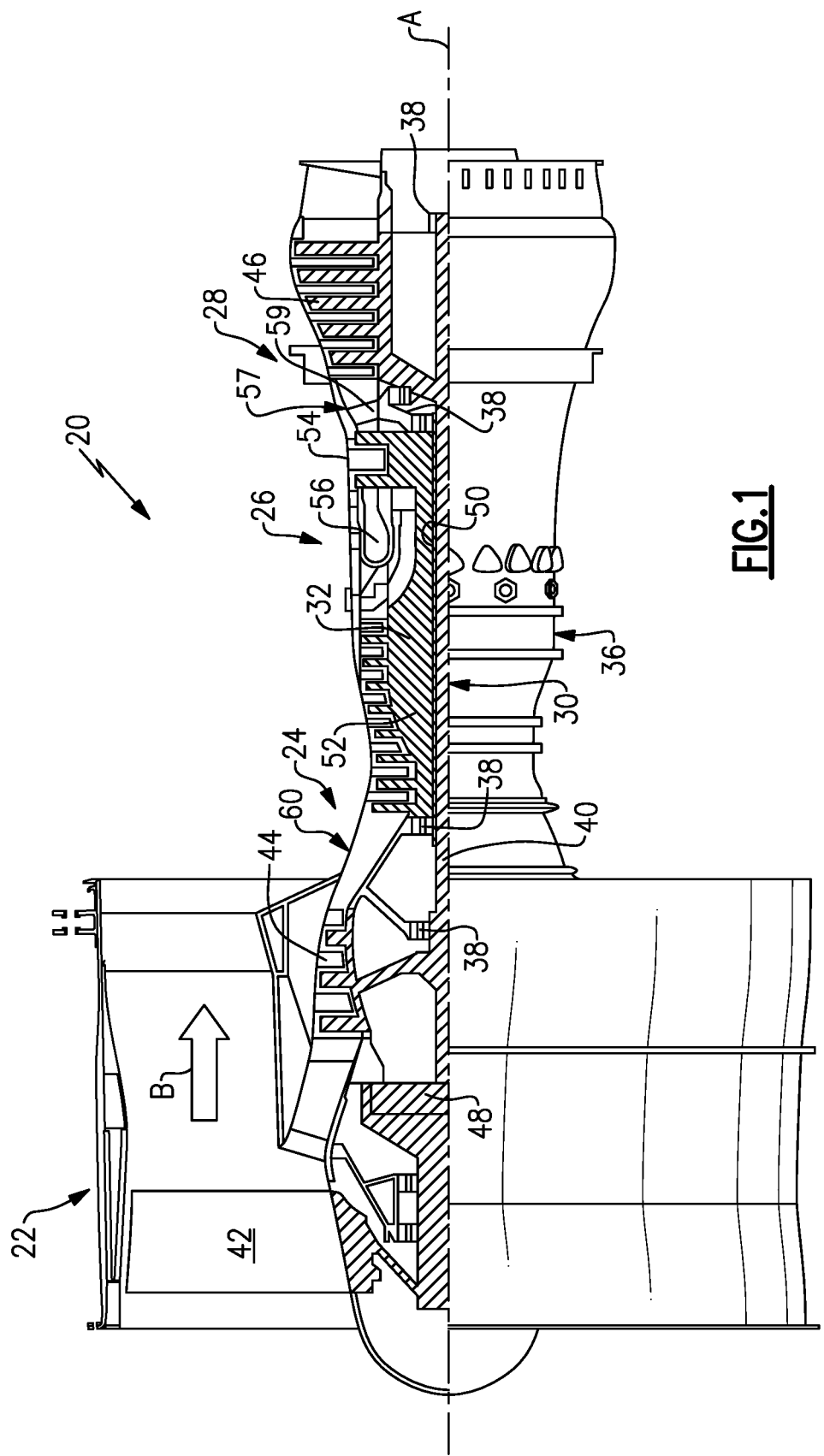
FIG. 1 schematically illustrates an embodiment of a gas turbine engine.
Figure 2:
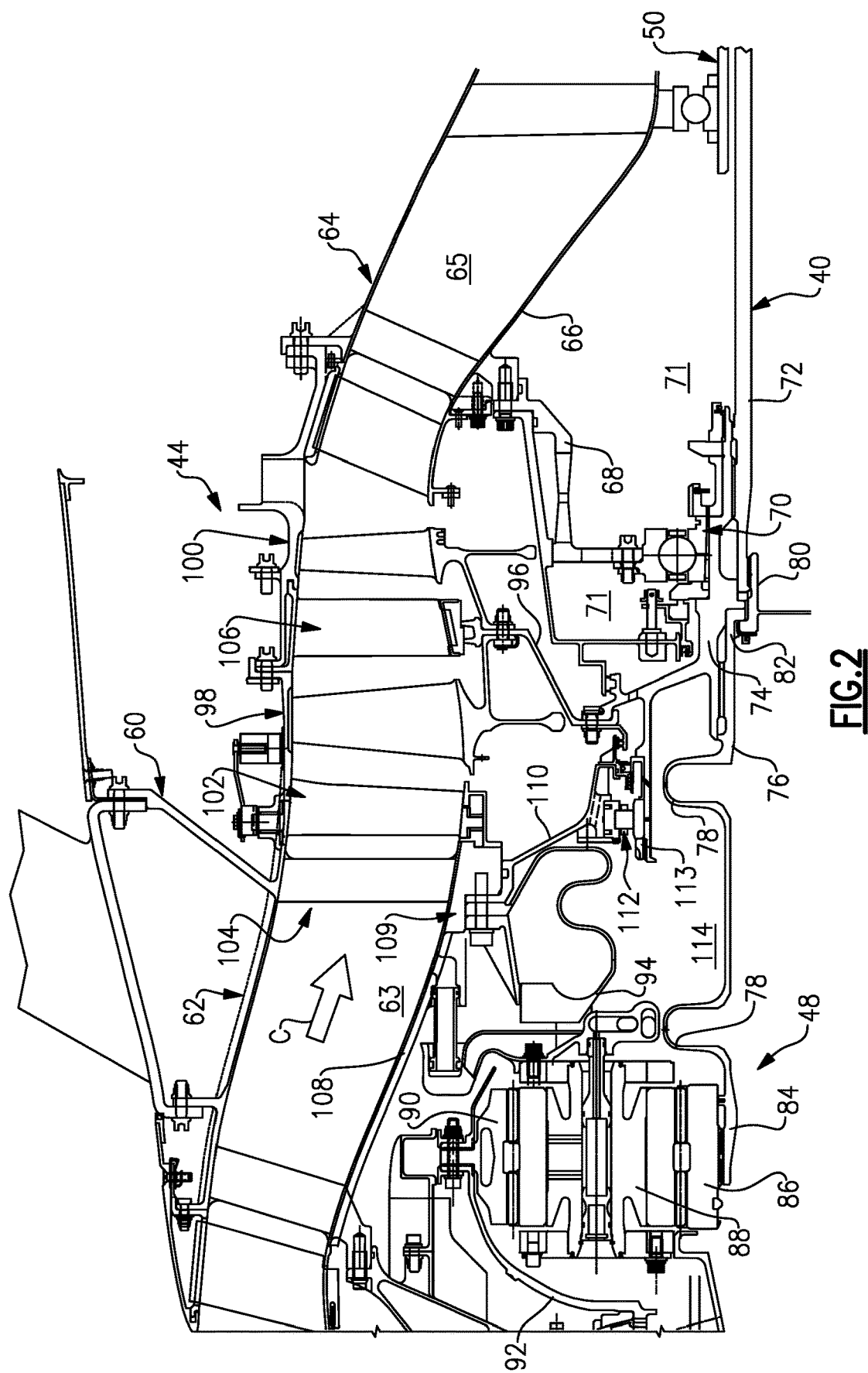
FIG. 2 is a cross-sectional view of a front architecture of the gas turbine engine embodiment shown in FIG. 1.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C (as shown in FIG. 2) for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example a high-bypass geared aircraft engine. In a further example, the engine 20 bypass ratio is greater than about six (6), with an example embodiment being greater than ten (10). The example speed reduction device is a geared architecture 48 however other speed reducing devices such as fluid or electromechanical devices are also within the contemplation of this disclosure. The example geared architecture 48 is an epicyclic gear train, such as a star gear system or other gear system, with a gear reduction ratio of greater than about 2.3, or more specifically, a ratio of from about 2.2 to about 4.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ambient}° R)/518.7° R)^{0.5}]$. The "Low corrected fan tip speed" as disclosed herein according to one non-limiting embodiment is less than about 1150 ft/second.

Referring to FIG. 2, a core housing 60 includes an inlet case 62 and an intermediate case 64 that respectively provide an inlet case flowpath 63 and a compressor case flowpath 65. In other embodiments, the core housing may include additional cases. Similarly, the compressor section as a whole may include any number of cases. Together, the inlet and compressor case flowpaths 63, 65, in part, define a core flowpath through the engine 20, which directs a core flow C.

The intermediate case 64 includes multiple components, including the intermediate case portion 66, and the bearing support 68 in the example, which are removably secured to one another. The bearing support portion 68 has a first bearing 70 mounted thereto, which supports the inner shaft 40 for rotation relative to the intermediate case 64. In one example, the first bearing 70 is a ball bearing that constrains the inner shaft 40 against axial and radial movement at a forward portion of the inner shaft 40. The first bearing 70 is arranged within a bearing compartment 71.

In the example, the inner shaft 40 is constructed of multiple components that include, for example, a main shaft 72, a hub 74 and a flex shaft 76, which are clamped together by a nut 80 in the example. The first bearing 70 is mounted on the hub 74 (i.e., low pressure compressor hub). The flex shaft 76 includes first and second opposing ends 82, 84. The first end 82 is splined to the hub 74, and the second end 84 is splined to and supports a sun gear 86 of the geared architecture 48. Bellows 78 in the flex shaft 76 accommodate vibration in the geared architecture 48.

The geared architecture includes star gears 88 arranged circumferentially about and intermeshing with the sun gear 86. A ring gear 90 is arranged circumferentially about and intermeshes with the star gears 88. A fan shaft 92 is connected to the ring gear 90 and the fan 42 (FIG. 1). A torque frame 94 supports the star gears 88 and grounds the star gears 88 to the housing 60. In operation, the inner shaft 40 rotationally drives the fan shaft 92 with the rotating ring gear 90 through the grounded star gears 88.

The low pressure compressor 44 includes multiple compressor stages arranged between the inlet and intermediate case flowpaths 63, 65, for example, first and second compressor stages 98, 100, that are secured to the hub 74 by a rotor 96. The first bearing 70 is axially aligned with one of the first and second compressor stages 98, 100. In one example, a variable stator vane array 102 is arranged upstream from the first and second compressor stages 98, 100. Struts 104 are arranged upstream from the variable stator vane array 102. An array of fixed stator vanes 106 may be provided axially between the first and second compressor stages 98, 100. Although a particular configuration of low pressure compressor 44 is illustrated, it should be understood that other configurations may be used and still fall within the scope of this disclosure.

The inlet case 62 includes inlet case portions 108, and bearing support 110, which are removably secured to one another. The bearing support portion 110 and torque frame 94 are secured to the inlet case portion 108 at a joint 109. The bearing support portion 110 supports a second bearing 112, which is a rolling bearing in one example. The second bearing 112 is retained on the hub 74 by a nut 113, for example, and is arranged radially outward from the flex shaft 76 and radially between the torque frame 94 and flex shaft 76. In the example, the second bearing 112 is axially aligned with and radially inward of the variable stator vane array 102. The geared architecture 48 and the second bearing 112 are arranged in a lubrication compartment 114, which is separate from the bearing compartment 71 in the example.

Figure 3:
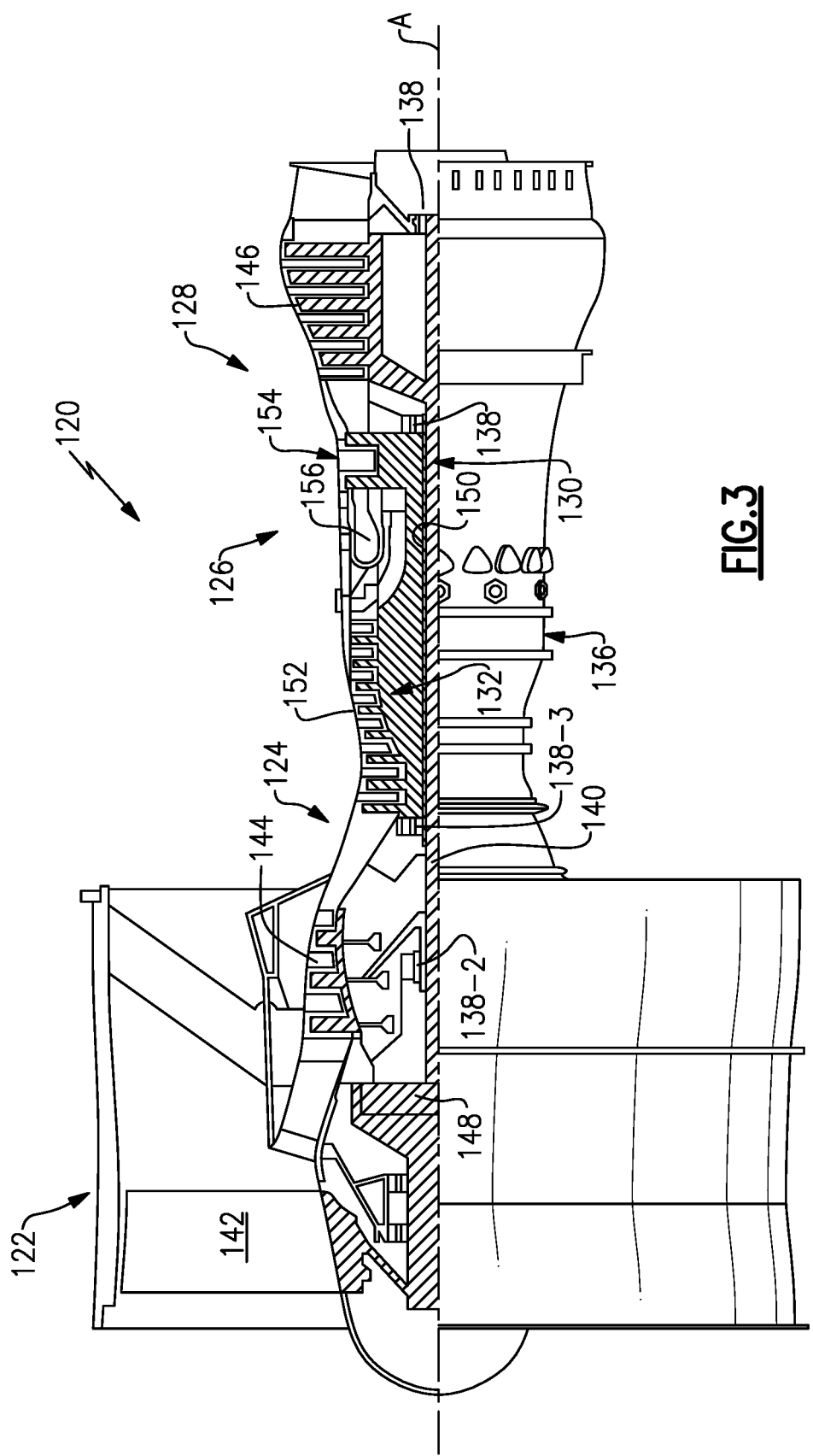
FIG. 3 is a schematic cross-section of a gas turbine engine embodiment.

FIG. 3 schematically illustrates another exemplary gas turbine engine 120. The gas turbine engine 120 is disclosed herein as a two-spool turbofan that generally incorporates a fan section 122, a compressor section 124, a combustor section 126 and a turbine section 128. Alternative engines might include an augmentor section (not shown) among other systems or features. The fan section 122 drives air along a bypass flowpath while the compressor section 124 drives air along a core flowpath for compression and communication into the combustor section 126 then expansion through the turbine section 128. Although depicted as a two-spool turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 120 generally includes a low spool 130 and a high spool 132 mounted for rotation about an engine central longitudinal axis A relative to an engine static structure 136 via several bearing supports 138. The low spool 130 generally includes an inner shaft 140 that interconnects a fan 142, a low pressure compressor 144 and a low pressure turbine 146. The inner shaft 140 drives the fan 142 through a speed change mechanism, which in exemplary gas turbine engine 120 is illustrated as a geared architecture 148 to drive the fan 142 at a lower speed than the low spool 130. An exemplary reduction transmission is an epicyclic transmission, namely a planetary or star gear system.

The high spool 132 includes an outer shaft 150 that interconnects a high pressure compressor 152 and high pressure turbine 154. A combustor 156 is arranged between the high pressure compressor 152 and the high pressure turbine 154. The inner shaft 140 and the outer shaft 150 are concentric and rotate about the engine central longitudinal axis A which is collinear with their longitudinal axes.

Core airflow is compressed by the low pressure compressor 144 then the high pressure compressor 152, mixed with the fuel and burned in the combustor 156, then expanded over the high pressure turbine 154 and low pressure turbine 146. The turbines 154, 146 rotationally drive the respective low spool 130 and high spool 132 in response to the expansion.

The main engine shafts 140, 150 are supported at a plurality of points by bearing supports 138 within the static structure 136. In one non-limiting embodiment, bearing supports 138 includes a #2 bearing system 138-2 located radially inboard of the compressor section 124.

Figure 4:
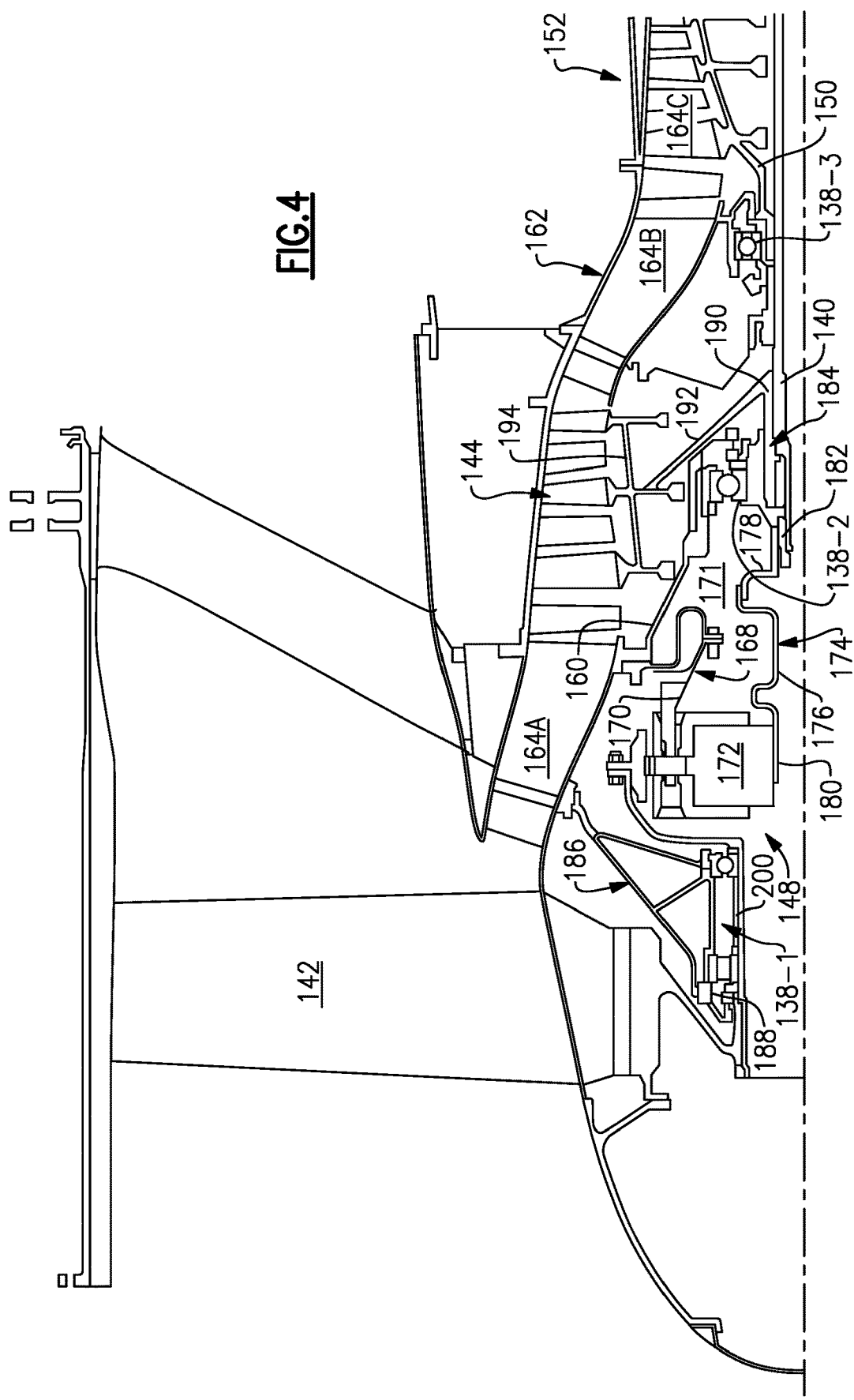
FIG. 4 is an enlarged schematic cross-section of a sectional of the gas turbine engine embodiment which illustrates a front center body case structure.

With reference to FIG. 4, the engine static structure 136 proximate the compressor section 124 generally includes a front center body case structure 160 and an intermediate case structure 162 which mounts aft of the front center body case structure 160. It should be appreciate that various case structures may alternatively or additionally be provided, yet benefit from the architecture described herein.

The front center body case structure 160 generally defines an annular core flow path 164A for the core airflow into the low pressure compressor 144. The intermediate case structure 162 defines a core flow path 164B which continues the core flow path 164A for the core airflow into the high pressure compressor 152 of core flow path 164C. The core flow path 164B is generally radially inward of the core flow path 164A to transition into the radially smaller diameter core flow path 164C. That is, the core flow path 164B defines a "wasp waist" gas turbine engine architecture.

A #2 bearing system 138-2 (i.e., second bearing) at least partially supports the inner shaft 140 relative to the front center body case structure 160. A #3 bearing system 138-3 (i.e., first bearing) generally supports the outer shaft 150 relative the intermediate case structure 162. That is, the #2 bearing system 138-2 at least partially supports the low spool 130 and the #3 bearing system 138-3 generally supports the high spool 132. It should be appreciated that various bearing systems such as thrust bearing structures and mount arrangements will benefit herefrom.

A flex support 168 provides a flexible attachment of the geared architecture 148 within the front center body case structure 160. The flex support 168 reacts the torsional loads from the geared architecture 148 and facilitates vibration absorption as well as other support functions. A centering spring 170, which is a generally cylindrical cage-like structural component with a multiple of beams that extend between flange end structures, resiliently positions the #2 bearing system 138-2 with respect to the low spool 130. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

The gearbox 172 of the geared architecture 148 is driven by the low spool 130 in the disclosed non-limiting embodiment through a coupling shaft 174. The coupling shaft 174 transfers torque to the gearbox 172. The #2 bearing system 138-2 facilitates the segregation of vibrations and other transients from the gearbox 172. The coupling shaft 174 in the disclosed non-limiting embodiment includes a forward coupling shaft section 176 and an aft coupling shaft section 178. The forward coupling shaft section 176 includes an interface spline 180 which mates with the gearbox 172. An interface spline 182 of the aft coupling shaft section 178 connects the coupling shaft 174 to the low spool 130 and, in this non limiting embodiment, to a low pressure compressor hub 184 of the low pressure compressor 144.

A fan rotor bearing system structure 186 aft of the fan 142 extends radially inward from the front center body case structure 160. The fan rotor bearing system structure 186 and the front center body case structure 160 define a bearing compartment 171. It should be appreciated that various bearing supports 138-1 and seals 188 (illustrated schematically and in FIG. 4) may be supported by the fan rotor bearing system structure 186 to contain oil and support rotation of an output shaft 200 which connects with the geared architecture 148 to drive the fan 142.

Figure 5:
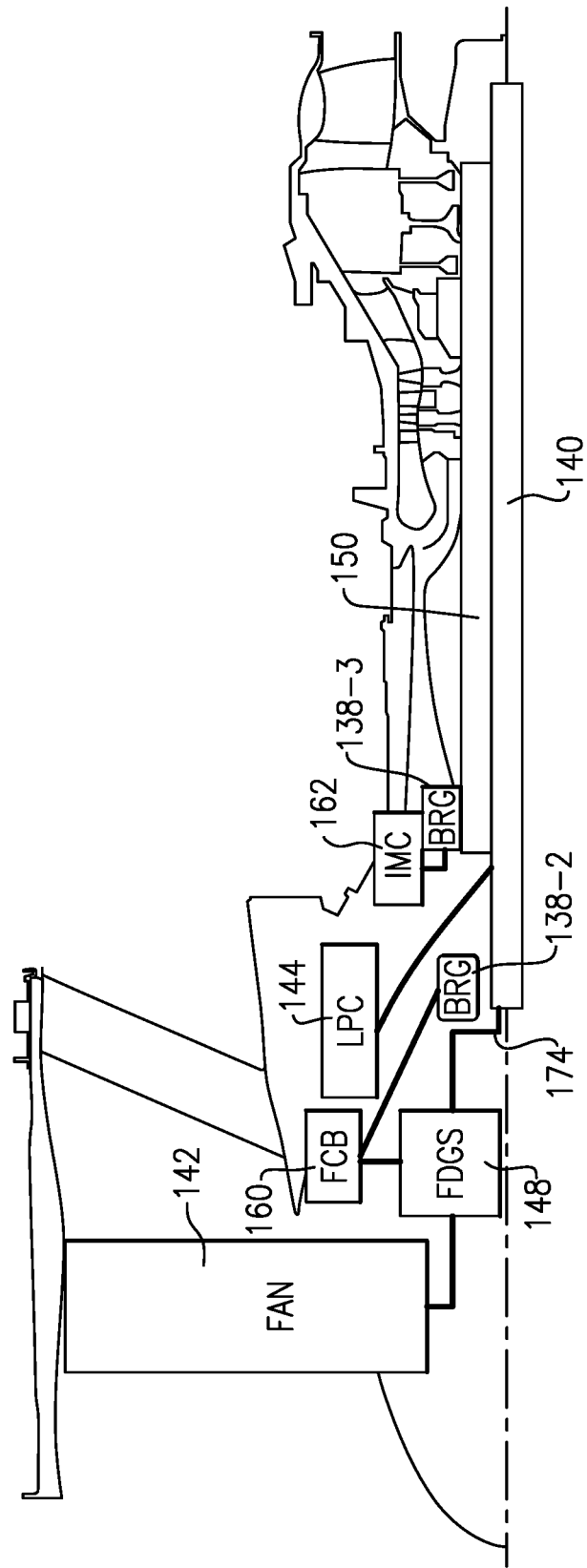
FIG. 5 is a schematic block diagram of a gas turbine engine embodiment with the disclosed architecture.

The low pressure compressor hub 184 of the low pressure compressor 144 includes a tubular hub 190 and a frustro-conical web 192. The tubular hub 190 mounts to the inner shaft 140 through, for example, a splined interface. The tubular hub 190 is adjacent to the #2 bearing system 138-2. The frustro-conical web 192 extends in a forwardly direction from the tubular hub 190 axially between the #2 bearing system 138-2 and the #3 bearing system 138-3 (also shown in FIG. 5). That is, the frustro-conical web 192 is axially located between the bearing supports 138-2, 138-3.

The frustro-conical web 192 mounts to a low pressure compressor rotor 194 of the low pressure compressor 144. In the disclosed non-limiting embodiment, the frustro-conical web 192 extends between the bearing systems 138-2, 138-3 and mounts to a second stage of a three stage low pressure compressor rotor 194. It should be appreciated that the frustro-conical web 192 may mount to other stages in other engine architectures and such architectures may include other numbers of stages.

Figure 6:
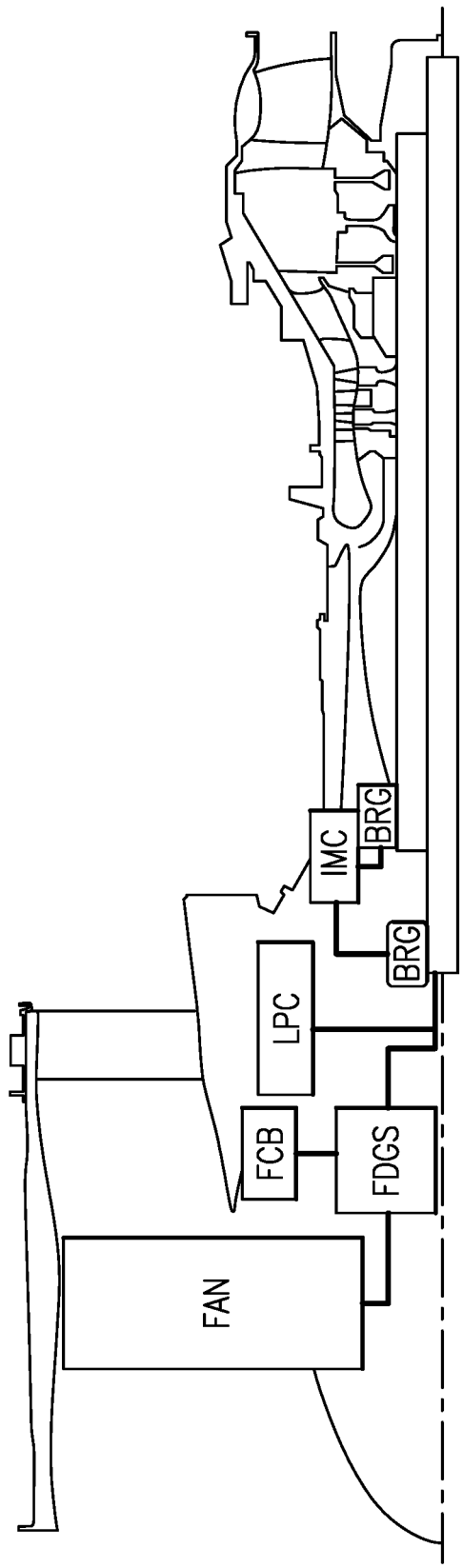
FIG. 6 is a schematic block diagram of a RELATED ART gas turbine engine with the disclosed architecture.

Locating the low pressure compressor hub 184 between the #2 bearing system 138-2 and the #3 bearing system 138-3 offers significant advantage to reduce deflection for the geared architecture 148 as compared to a related art architecture such as the example illustrated in FIG. 6; RELATED ART. That is, both end sections of the coupling shaft 174 are tied to the front center body case structure 160 such that relative deflections between the end sections thereof are greatly reduced. This facilitates a more efficient balance of baseline torque, FBO torques, maneuver deflections and the minimization of the overall loads that are translated into the geared architecture 148.

Moreover, a relatively less complicated bearing compartment 171 which facilitates increased manufacturing tolerances is defined to, for example, require fewer seals which minimizes potential oil leak sources and saves weight.

The architecture further facilitates an efficient load path (L; FIG. 7) for the geared architecture and an overall lower overall heat generation and oil flow. That is, a more compact load path L is defined by the forward center body structure 160 alone in that the front center body structure 160 supports both the bearing system 138-2 and the geared architecture 148. Secondary benefits are reduced oil tank size, reduced cooler sizing and reduce oil quantity in the engine lubrication system.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising: a core housing providing a core flow path;
   a fan arranged fluidly upstream from the core flow path;
   a first shaft supporting a compressor section arranged within the core flow path, the compressor section including a high pressure compressor and a low pressure compressor, wherein the fan drives air along the core flow path and into the compressor section;
   a first bearing and a second bearings supporting the first shaft relative to the core housing and arranged radially inward of and axially overlapping with the compressor section;
   a low pressure compressor hub mounted to the first shaft, the low pressure compressor hub extends to the low pressure compressor section between the first bearing and the second bearing; and
   wherein the low pressure compressor hub has a cantilevered portion radially spaced from the first shaft and supporting the second bearing.

2. The gas turbine engine according to claim 1, further comprising:
   a combustor fluidly connected to the compressor section; and
   a turbine section fluidly connected to the combustor.

3. The gas turbine engine according to claim 2, further comprising:
   a front center body case structure, the second bearing is mounted to the front center body case structure to rotationally support the first shaft;
   a geared architecture at least partially supported by the front center body case structure; and
   a coupling shaft mounted to the first shaft and the geared architecture, the coupling shaft at least partially supported by the first bearing.

4. The gas turbine engine as recited in claim 3, wherein the first shaft drives the fan through the geared architecture.

5. The gas turbine engine as recited in claim 3, wherein the first shaft is an inner shaft, and the gas turbine engine further comprising an outer shaft which at least partially surrounds the inner shaft, the outer shaft drives the high pressure compressor.

6. The gas turbine engine according to claim 1, wherein the core housing includes an inlet case portion defining an inlet case flow path, and a second bearing support portion removably secured to the inlet case portion, the second bearing mounted to the second bearing support portion.

7. The gas turbine engine according to claim 1, wherein the core housing includes an intermediate case portion defining an intermediate case flow path, and a first bearing support portion removably secured to the intermediate case portion, the first bearing mounted to the first bearing support portion.

8. The gas turbine engine as recited in claim 1, wherein the low pressure compressor hub includes a frustro-conical web which extends between the first bearing and the second bearing.

9. The gas turbine engine as recited in claim 1, wherein the low pressure compressor hub is angled, relative to an engine axis, toward the low pressure compressor section.

10. The gas turbine engine as recited in claim 1, wherein the low pressure compressor hub is mounted to a second stage disk of the low pressure compressor section.

11. The gas turbine engine as recited in claim 10, wherein the low pressure compressor section includes three stages.

12. The gas turbine engine according to claim 1, further comprising a geared architecture driving the fan, and wherein the first shaft includes a main shaft and a gear input shaft, the gear input shaft including a first end secured to the main shaft and a second end connected to the geared architecture.

13. The gas turbine engine according to claim 12, wherein a portion of the low pressure compressor hub radially inboard of the second bearing is radially spaced from the gear input shaft.

14. The gas turbine engine according to claim 12, wherein the gear input shaft is secured to the main shaft at an interface spline, and wherein the first bearing is axially aft of the interface spline.

15. The gas turbine engine according to claim 12, further comprising a third bearing axially forward of the geared architecture and supporting an output shaft, the output shaft connecting to the geared architecture and driving the fan.

16. The gas turbine engine according to claim 1, wherein the second bearing is arranged axially between a leading edge of a first blade stage of the low pressure compressor and a trailing edge of a last blade stage of the low pressure compressor.

17. A gas turbine engine comprising:
    a core housing providing a core flow path;
    a fan arranged fluidly upstream from the core flow path;
    a first shaft supporting a compressor section arranged within the core flow path, wherein the fan drives air along the core flow path and into the compressor section;
    a first bearing and a second bearing supporting the first shaft relative to the core housing and arranged radially inward of and axially overlapping with the compressor section; and
    a low pressure compressor hub mounted to the first shaft and including a cantilevered portion radially spaced from the first shaft and supporting the second bearing.

18. The gas turbine engine according to claim 17, wherein the core housing includes an inlet case and an intermediate case, and further comprising a third bearing supporting a second shaft relative to the intermediate case.

19. The gas turbine engine according to claim 17, configured to drive the fan through a geared architecture including a sun gear, and wherein the first shaft includes a main shaft and a gear input shaft, the gear input shaft including a first end secured to the main shaft and a second end opposite the first end and supporting the sun gear.

* * * * *